(12) United States Patent
Sasaki et al.

(10) Patent No.: US 7,388,036 B2
(45) Date of Patent: Jun. 17, 2008

(54) FLEXIBLE POLYURETHANE FOAM, PROCESS FOR ITS PRODUCTION, AND SEAT FOR AUTOMOBILE EMPLOYING IT

(75) Inventors: Takayuki Sasaki, Ibaraki (JP); Yoshinori Toyota, Ibaraki (JP); Akio Horie, Ibaraki (JP); Takashi Ito, Ibaraki (JP); Satoru Hashimoto, Yokohama (JP); Kunio Asobe, Yokohama (JP)

(73) Assignees: Asahi Glass Company, Limited, Tokyo (JP); NHK Spring Co., Ltd., Yokohama-shi (JP)

( * ) Notice: Subject to any disclaimer, the term of this patent is extended or adjusted under 35 U.S.C. 154(b) by 65 days.

(21) Appl. No.: 11/431,818

(22) Filed: May 11, 2006

(65) Prior Publication Data

US 2006/0205834 A1    Sep. 14, 2006

Related U.S. Application Data

(63) Continuation of application No. PCT/JP04/17615, filed on Nov. 26, 2004.

(30) Foreign Application Priority Data

Nov. 26, 2003 (JP) .............................. 2003-395465

(51) Int. Cl.
 *C08G 18/48* (2006.01)
(52) U.S. Cl. .................. 521/131; 521/99; 521/130; 521/134; 521/137; 521/138; 521/170; 521/174
(58) Field of Classification Search ................ 521/130, 521/131, 134, 137, 138, 170, 174, 99
See application file for complete search history.

(56) References Cited

U.S. PATENT DOCUMENTS

| 6,239,247 | B1 * | 5/2001 | Allewaert et al. ............. 528/49 |
| 6,653,362 | B2 | 11/2003 | Toyota et al. |
| 6,706,923 | B2 * | 3/2004 | Haniff et al. ................ 564/297 |
| 6,734,219 | B2 | 5/2004 | Wada et al. |
| 6,756,415 | B2 | 6/2004 | Kimura et al. |
| 6,759,448 | B2 | 7/2004 | Toyota et al. |
| 2004/0152797 | A1 | 8/2004 | Wada et al. |
| 2004/0229970 | A1 | 11/2004 | Sasaki et al. |
| 2006/0205834 | A1 | 9/2006 | Sasaki et al. |

FOREIGN PATENT DOCUMENTS

| JP | 5-117352 | 5/1993 |
| JP | 5-320304 | 12/1993 |
| JP | 6-87945 | 3/1994 |
| JP | 7-330843 | 12/1995 |
| JP | 10-218957 | 8/1998 |
| JP | 11-60676 | 3/1999 |
| JP | 11-140154 | 5/1999 |
| JP | 11-322875 | 11/1999 |
| JP | 2000-313730 | 11/2000 |
| JP | 2001-139653 | 5/2001 |
| JP | 2001-329042 | 11/2001 |
| JP | 2003-119240 | 4/2003 |
| JP | 2003-226734 | 8/2003 |

OTHER PUBLICATIONS

U.S. Appl. No. 11/431,818, filed May 11, 2006, Sasaki et al.
U.S. Appl. No. 11/385,933, filed Mar. 22, 2006, Sasaki et al.
U.S. Appl. No. 11/375,012, filed Mar. 15, 2006, Sasaki et al.
U.S. Appl. No. 11/752,600, filed May 23, 2007, Sasaki et al.
Japanese Industrial Standard, JIS K 6400: 1997 (English translation).
Japanese Industrial Standard, JIS E 7104-1986 (English translation).
U.S. Appl. No. 11/876,237, filed Oct. 22, 2007, Sasaki, et al.
U.S. Appl. No. 11/944,002, filed Nov. 21, 2007, Sasaki, et al.
U.S. Appl. No. 11/944,730, filed Nov. 26, 2007, Sasaki, et al.
U.S. Appl. No. 11/944,665, filed Nov. 26, 2007, Sasaki, et al.
U.S. Appl. No. 11/944,799, filed Nov. 26, 2007, Sasaki, et al.

* cited by examiner

*Primary Examiner*—John Cooney
(74) *Attorney, Agent, or Firm*—Oblon, Spivak, McClelland, Maier & Neustadt, P.C.

(57) ABSTRACT

A novel flexible polyurethane foam having good vibration characteristics and being excellent in occupant posture stability, is provided.

A flexible polyurethane foam obtainable by reacting a high molecular weight polyoxyalkylene polyol or a polymer-dispersed polyol containing fine polymer particles in the high molecular weight polyoxyalkylene polyol, with a polyisocyanate compound in the presence of a catalyst, a blowing agent and a foam stabilizer, characterized in that as at least a part of the foam stabilizer, the following fluorinated compound (F) is used in an amount of from 0.00001 to 1 part by mass per 100 parts by mass of all active hydrogen compounds:

fluorinated compound (F): a compound which is a copolymer of a fluorinated acrylate or a fluorinated methacrylate (p), an alkyl acrylate having a long chain alkyl group, an alkyl methacrylate having a long chain alkyl group, an acrylate containing an oxyalkylene group or a methacrylate containing an oxyalkylene group (q), and optional other copolymerizable monomer (r), wherein the fluorine content is from 12 to 50 mass %.

9 Claims, No Drawings

FLEXIBLE POLYURETHANE FOAM, PROCESS FOR ITS PRODUCTION, AND SEAT FOR AUTOMOBILE EMPLOYING IT

TECHNICAL FIELD

The present invention relates to a novel flexible polyurethane foam suitable for a urethane cushion material, particularly for an automobile seat, which provides excellent riding comfort.

BACKGROUND ART

In recent years, in the field of polyurethane foams useful for various applications, various researches and developments have been made in order to improve the characteristics suitable for the respective applications. For example, along with upgrading of automobile seats in order to improve the riding comfort of seat cushion, it is targeted to improve the impact resilience, vibration characteristics, durability, etc. With respect to the vibration characteristics, the influence of car body vibration over a human body varies depending upon the vibration frequency. However, it is considered effective for improvement of the riding comfort to take damping of vibration particularly large in a frequency range (for example from 4 to 8 Hz or from 6 to 20 Hz) to which a human is sensitive. Further, it is considered that in order to improve these characteristics, a seat cushion is effective which employs a polyoxyalkylene polyol having a higher molecular weight than one heretofore produced.

On the other hand, as a seat cushion, a combination of a metal spring with a pad material made of a flexible polyurethane foam (hereinafter referred to simply as a flexible foam) has been used in many cases. However, in recent years, there has been a trend of employing an automobile seat so-called a deep foam type whereby a metal spring is abolished by imparting spring characteristics to the flexible foam itself to meet the demand for e.g. cost down, reduction of weight, etc. The deep foam type seat has become thick, since no metal spring is used in combination.

Further, the characteristics of the flexible foam have become a factor substantially influential over the sitting comfort and riding comfort of the seat. Namely, the static characteristics and dynamic characteristics as indices for the sitting comfort and riding comfort, have been regarded as important in the development of flexible foams. Among the static characteristics, it is particularly important to control the supported feeling at the initial stage of sitting and the bottom hitting feeling at the final stage of sitting.

When a person actually sits on a seat provided with a pad material of flexible foam, the flexible foam will be compressed and deflected, and the position of e.g. the hip will sink to a certain height. As a method for measuring this static characteristic (the static sitting feeling), a test method may be employed wherein the deflection is measured in a load test in accordance with a performance test method for a pad material for an automobile seat according to JASO automobile standard B408-89 (1989), to obtain a load-deflection curve, or the deflection under a load of 500 N (Newton Load) may be used which is obtained from a load-deflection curve obtained by the measurement employing a pressure plate in accordance with JIS E7104 (2002). This pressure plate is oval with a long diameter A of 300 mm, a short diameter B of 250 mm and a thickness C of at least 35 mm and is so-called Tekken Plate.

On the other hand, the polyoxyalkylene polyol to be used as a material for the flexible foam, is usually produced by ring-opening polymerization of an alkylene oxide such as propylene oxide, which is carried out by using a sodium/potassium catalyst such as sodium hydroxide or potassium hydroxide and an initiator such as a polyhydric alcohol. By this production method, an unsaturated monool having an unsaturated bond (hereinafter referred to simply as a monool) will be formed as a by-product, and the amount of such a monool produced, will increase with an increase of the molecular weight of the polyoxyalkylene polyol (a decrease of the hydroxyl value).

In the case of a polyoxyalkylene polyol having a hydroxyl value of about 56 mgKOH/g which is commonly used as a material for elastic polyurethane foams, the amount of such a monool produced, is not so large as to bring about a problem. However, in the case of a polyoxyalkylene polyol having a high molecular weight and a low hydroxyl value, the amount of such a monool produced, will be problematic. Namely, in a case where an elastic polyurethane foam is produced by using a polyoxyalkylene polyol having a large monool content (a high total unsaturation value), there will be a problem such as a decrease in hardness or a decrease in compression set of the produced foam, or a decrease in the curing property at the time of the production of the foam. Further, even if it is attempted to produce a polyoxyalkylene polyol having a low hydroxyl value by using a sodium/potassium catalyst, the amount of the monool produced will be so large that such production will be practically difficult.

Under the circumstances, a method has been proposed wherein in order to improve the characteristics such as the riding comfort, durability, etc. for an automobile seat, a polyoxyalkylene polyol having a low monool content is used for the production of an elastic polyurethane foam (Patent Document 1).

However, it has been found that an elastic polyurethane foam represented by a deep foam type produced by using a polyoxyalkylene polyol having a low monool content, has an-extremely high impact resilience (impact resilience of core portion: 71 to 74%), whereby the riding comfort is inadequate from the viewpoint of the occupant posture stability or supporting performance during traveling. In order to solve such problems, an invention has been proposed to suppress the impact resilience by a combined use of a polyoxyalkylene polyol having a low unsaturation value and a polyoxyalkylene polyol having a low molecular weight with a hydroxyl value of from 90 to 300 mgKOH/g (Patent Document 2), but the hysteresis loss has been relatively large at a level of from 25 to 33%, such being disadvantageous from the viewpoint of the durability.

Further, with a seat of the above-mentioned deep foam type structure, the load-deflection characteristics are substantially influenced by the flexible foam itself, and it will be a seat having a relatively small difference in deflection on pressure side of from 500 N to 900 N, when the deflection under load is measured when it is pressed by the above-mentioned pressure plate from above. A seat having a small difference in deflection presents a bottom-hitting feeling and thus showed a tendency that the evaluation of the riding comfort was poor. Therefore, with a seat of deep foam type, in order to increase the difference in deflection, the thickness of the foam was increased. As a technique to increase the difference in deflection without increasing the thickness of the foam, it was proposed to use a fluorinated surfactant having a perfluoroalkyl group structure (Patent Document 3). However, a problem has been pointed out such that the effects tend to be different depending upon the structure of the fluorined surfactant.

On the other hand, in a method for producing a polyurethane foam by reacting a polyol component comprising a polyol, a catalyst, a blowing agent and other additives, with a polyisocyanate compound, it has been proposed to add a certain specific bifunctional secondary amine in order to produce a foam having a reduced inclination of the curve on pressure side at a deflection of 75% as an index for evaluating the bottom hitting feeling, which has no bottom-hitting feeling, and has all of the flexibility, the sinking degree and the vibration characteristics well balanced. However, the supported feeling was inadequate, and the durability, particularly the compression set under heat and humidity, was inadequate (Patent Document 4).

Further, a technique is known to increase the density of the surface skin layer of the foam by means of a fluorinated compound (Patent Document 5). This technique is a technique to be applied particularly for an integral skin foam and is substantially different from the content of the present invention.

Patent Document 1: JP-A-7-330843
Patent Document 2: JP-A-11-60676
Patent Document 3: JP-A-11-322875
Patent Document 4: JP-A-5-320304
Patent Document 5: JP-A-6-87945

DISCLOSURE OF THE INVENTION

Problem to be Solved by the Invention

The present invention is to provide a novel flexible polyurethane foam having good vibration characteristics and being excellent in occupant posture stability.

Means to Solve the Problem

The present invention is an invention having the following gists to solve the above problem.

A flexible polyurethane foam obtainable by reacting a high molecular weight polyoxyalkylene polyol or a polymer-dispersed polyol containing fine polymer particles in the high molecular weight polyoxyalkylene polyol, with a polyisocyanate compound in the presence of a catalyst, a blowing agent and a foam stabilizer, characterized in that as at least a part of the foam stabilizer, the following fluorinated compound (F) is used in an amount of from 0.00001 to 1 part by mass per 100 parts by mass of all active hydrogen compounds.

The above flexible polyurethane foam characterized in that with respect to a foam obtained by foaming into a thickness of 100 mm, X (N/314 cm$^2$) i.e. the 25% hardness (ILD) measured in accordance with JIS K6400 (1997) and Y (mm) i.e. the value (the difference in deflection on pressure side) obtained by subtracting the deflection on 500 N pressure side from the deflection on 900 N pressure side obtained from a load-deflection curve as measured by means of a pressure plate (Tekken Plate) in accordance with JIS E7104 (2002), satisfy a relation formula represented by the formula (1):

$$Y \geq -0.000370842X^2 + 0.225401X - 10.5013 \quad (1)$$

A seat for an automobile made of the above flexible polyurethane foam.

A process for forming a flexible polyurethane foam, which comprises reacting a high molecular weight polyoxyalkylene polyol or a polymer-dispersed polyol containing fine polymer particles in the high molecular weight polyoxyalkylene polyol, with a polyisocyanate compound in the presence of a catalyst, a blowing agent and a foam stabilizer, characterized in that as at least a part of the foam stabilizer, the following fluorinated compound (F) is used in an amount of from 0.00001 to 1 part by mass per 100 parts by mass of all active hydrogen compounds.

Fluorinated compound (F): a compound which is a copolymer of a fluorinated acrylate or a fluorinated methacrylate (p), an alkyl acrylate having a long chain alkyl group, an alkyl methacrylate having a long chain alkyl group, an acrylate containing an oxyalkylene group or a methacrylate containing an oxyalkylene group (q), and optional other copolymerizable monomer (r), wherein the fluorine content is from 12 to 50 mass %.

In the present invention, an acrylate and a methacrylate will be hereinafter generally referred to as a (meth)acrylate.

Effects of the Invention

In the present invention, the specific fluorinated compound is used as a foam stabilizer, whereby a novel flexible polyurethane foam is provided which has good vibration characteristics and which is excellent in occupant posture stability.

BEST MODE FOR CARRYING OUT THE INVENTION

High Molecular Weight Polyoxyalkylene Polyol

The high molecular weight polyoxyalkylene polyol to be used for the production of the flexible polyurethane foam of the present invention is preferably one obtained by ring-opening polymerization of a cyclic ether in the presence of a polymerization catalyst by using as an initiator an active hydrogen compound having an average number of hydroxyl groups of from 2 to 6. It is preferably one having a molecular weight per hydroxyl group of at least 500, particularly preferably from 1,000 to 5,000. The molecular weight per hydroxyl group is particularly preferably from 1,500 to 2,500.

The average number of hydroxyl groups in the high molecular weight polyoxyalkylene polyol is the average number of hydroxyl groups of the initiator. Further, the high molecular weight polyoxyalkylene polyol is regarded as having a molecular weight calculated by the following formula based on the hydroxyl value measured in accordance with JIS K-1557:

Molecular weight=(56100×the number of hydroxyl groups in the polyol)/hydroxyl value The polymerization catalyst may, for example, be an alkali metal compound or an alkali metal hydroxide, such as a potassium compound such as potassium hydroxide or potassium methoxide, or a cesium compound such as cesium metal, cesium hydroxide, cesium carbonate or cesium methoxide, a cationic polymerization catalyst such as boron trifluoride, a composite metal cyanide complex, or a phosphazenium compound. Among such catalysts, a usual alkali catalyst such as potassium hydroxide, a cesium compound or a composite metal cyanide complex, is preferred. In order to obtain a polymer having a large molecular weight, it is particularly preferred to employ a composite metal cyanide complex.

As the above-mentioned cyclic ether, an alkylene oxide having at least two carbon atoms is preferred. Specific examples include ethylene oxide, propylene oxide, 1,2-butylene oxide, 2,3-butylene oxide and styrene oxide. It is particularly preferred to use, in combination, ethylene oxide and at least one member selected from propylene oxide, 1,2-butylene oxide and 2,3-butylene oxide.

Further, the high molecular weight polyoxyalkylene polyol preferably has oxyethylene groups, particularly preferably at its terminals. Further, it may be a polyoxyalkylene polyol having oxyethylene groups in its interior. Such a polyoxyalkylene polyol having oxyethylene groups in its interior may, for example, be obtained by ring opening polymerization by mixing an alkylene oxide having at least 3 carbon atoms and ethylene oxide to an initiator sequentially or all at once.

The polyoxyalkylene polyol having oxyethylene groups at its terminals may, for example, be obtained by ring opening polymerization of an alkylene oxide having at least 3 carbon atoms with an initiator, followed by ring opening polymerization of ethylene oxide. Further, it may be obtained by mixing an alkylene oxide having at least 3 carbon atoms and ethylene oxide to the above-mentioned initiator sequentially or all at once for ring opening polymerization, followed by ring opening polymerization of ethylene oxide thereto.

The lower limit of the content of the terminal oxyethylene groups in the polyoxyalkylene polyol is preferably 3 mass %, particularly preferably 5 mass %, and the upper limit is preferably 25 mass %. If the content of the terminal oxyethylene groups is less than 3 mass %, collapse of foam, etc. tend to occur. On the other hand, if it exceeds 25 mass %, independent cells in the foam tend to increase, whereby the foam is likely to break at the time of crushing treatment, or shrinkage or the like is likely to occur after the crushing treatment.

Further, the content of all oxyethylene groups is preferably at most 30 mass %.

The initiator may, for example, be ethylene glycol, diethylene glycol, dipropylene glycol, neopentyl glycol, 1,4-butanediol, 1,6-hexanediol, glycerol, trimethylolpropane, pentaerythritol, diglycerol, dextrose, sucrose, bisphenol A or a compound having a small amount of an alkylene oxide added thereto, and it is preferred to use one of them or two or more of them in combination. If the average number of hydroxyl groups is smaller than 2, the durability of the foam or the riding comfort is likely to deteriorate. On the other hand, if the average number of hydroxyl groups is larger than 6, the flexible foam thereby produced tends to be hard, and the mechanical properties such as elongation tend to deteriorate. Either case is undesirable.

In the present invention, it is preferred to use a polyoxyalkylene polyol (a) as at least a part of the high molecular weight polyoxyalkylene polyol. The polyoxyalkylene polyol (a) is a polyoxyalkylene polyol having an unsaturation value of at most 0.07 meq/g (hereinafter sometimes referred to as a polyol (a)). Particularly, in the high molecular weight polyoxyalkylene polyol, from 30 to 100 mass % is preferably the polyol (a), particularly preferably from 40 to 100 mass % is the polyol (a). Further, in a case where the high molecular weight polyoxyalkylene polyol contains fine polymer particles as described hereinafter, the proportions of the high molecular weight polyoxyalkylene polyol and the polyol (a) will be calculated, based on the mass of the polyol excluding the fine polymer particles.

The average molecular weight per hydroxyl group of the polyol (a) is preferably at least 500, more preferably from 1,000 to 5,000, particularly preferably from 1,500 to 2,500. If the average molecular weight per hydroxyl group is smaller than 1,500, the durability or riding comfort of the polyurethane foam is likely to be low. On the other hand, if it is larger than 2,500, the viscosity of the polyol tends to be high, whereby the operation efficiency tends to deteriorate.

Further, the polyol (a) preferably contains oxyethylene groups at its terminals, and the range of the content is as described with respect to the high molecular weight polyoxyalkylene polyol. The polyol (a) is preferably a polyol having the content of oxypropylene groups of at least 70 mass %, particularly preferably at least 75 mass %.

The polyol (a) has an unsaturation value of at most 0.07 meq/g, particularly preferably at most 0.05 meq/g. If the unsaturation value of the polyol (a) is larger than 0.07 meq/g, the durability or riding comfort of the polyurethane foam may sometimes decrease.

In the present invention, a polymer-dispersed polyol containing fine polymer particles in the high molecular weight polyoxyalkylene polyol, may be used. Such a polymer-dispersed polyol contains fine polymer particles in a polyoxyalkylene polyol matrix, and the fine polymer particles are preferably contained as dispersed. Such fine polymer particles are preferably an addition polymerization type polymer or a condensation polymerization type polymer.

Such an addition polymerization type polymer may, for example, be a homopolymer or copolymer of a vinyl monomer such as acrylonitrile, styrene, a methacrylate or an acrylate. The condensation polymerization type polymer may, for example, be a polyester, a polyurea, a polyurethane or a melamine resin. By the presence of such fine polymer particles, the hydroxyl value of the entire polymer-dispersed polyol may usually be made lower than the hydroxyl value of the matrix polyol.

The content of the fine polymer particles contained in the high molecular weight polyoxyalkylene polyol is preferably at most 50 mass %. If the content of the fine polymer particles is larger than 50 mass %, the viscosity tends to be high, such being troublesome. The fine polymer particles are preferably contained in an amount of from 1 to 35 mass % in the high molecular weight polyoxyalkylene polyol.

Fluorinated Compound (F)

In the present invention, as at least a part of the foam stabilizer, a fluorinated compound (F) is used which is a copolymer of a fluorinated (meth)acrylate (p), an alkyl (meth)acrylate having a long chain alkyl group, or a (meth)acrylate containing an oxyalkylene group (q), and optional other copolymerizable monomer (r), wherein the fluorine content is from 12 to 50 mass %.

As the fluorinated (meth)acrylate (p), a (meth)acrylate containing a $C_{4-20}$ polyfluoroalkyl group is preferred. Such a polyfluoroalkyl group is more preferably one having from 4 to 12 carbon atoms, particularly preferably a perfluoroalkyl group. The polyfluoroalkyl group and the (meth)acryloyl group may be bonded via a $C_{1-5}$ organic group.

Specifically, a compound represented by the formula (2) or (3) is preferred.

  $R^f\!-\!Z\!-\!OCOCH\!=\!CH_2$ (2)

  $R^f\!-\!Z\!-\!OCOC(CH_3)\!=\!CH_2$ (3)

Here, $R^f$ is a $C_{4-20}$ polyfluoroalkyl group, and Z is a bivalent connecting group.

Z is preferably one represented by $-SO_2N(R)CH_2CH_2-$, $-CON(R)CH_2CH_2-$ (wherein R is a hydrogen atom or a $C_{1-6}$ alkyl group), $-CH_2-$ or $-CH_2CH_2-$.

The alkyl(meth)acrylate having a long chain alkyl group (q1) is preferably one having an alkyl group having at least 10 carbon atoms. Such an alkyl group is preferably one having from 10 to 30 carbon atoms, particularly preferably one having from 15 to 22 carbon atoms. It may, for example, be n-cetyl(meth)acrylate, n-stearyl(meth)acrylate or n-behenyl(meth)acrylate.

The (meth)acrylate containing an oxyalkylene group (q2) may, for example, be polyoxyethylene glycol mono(meth)acrylate, polyoxypropyleneoxyethylene mono(meth)acrylate, polyoxyethylene glycol di(meth)acrylate or polyoxypropyleneoxyethylene di(meth)acrylate. The molecular weight of the (meth)acrylate containing an oxyalkylene group (q2) is preferably from 100 to 3,000.

The fluorinated compound (F) can be obtained by copolymerizing the above monomers by a known method. Further, optional other comonomer (r) may be copolymerized. The copolymerizable monomer (r) is a polymerizable unsaturated group-containing monomer other than (q), which contains no polyfluoroalkyl group, and specifically, it may, for example, be an alkyl (meth)acrylate having a short chain alkyl group, or an oxypropylene glycol mono(meth)acrylate. As such a short chain alkyl group, one having at most 9 carbon atoms is preferred, and a $C_{1-6}$ alkyl group is more preferred. Further, such a short chain alkyl group may be a group having a hydrogen atom substituted by a hydroxyl group, a primary amino group, a secondary amino group or a tertiary amino group.

The ratio of (q) to (p) is preferably from 0.01 to 100 mols, more preferably from 0.01 to 10 mols, particularly preferably from 0.1 to 10 mols, per mol of (p). In a case where (r) is to be used, it is preferably from 0.01 to 100 mols, more preferably from 0.1 to 10 mols, per mol of (p). Further, the proportion of (p) in the total amount of all monomers is more preferably from 1 to 80 mol %, most preferably from 20 to 70 mol %. Further, the proportion of (q) in the total amount of all monomers is more preferably from 0.1 to 80 mol %.

The fluorinated compound (F) preferably has a weight average molecular weight of from 1,000 to 100,000, more preferably from 2,000 to 90,000.

The above fluorinated compound is characterized in that the fluorine content is from 12 to 50 mass %. If the fluorine content is larger than 50 mass %, the stability of the foam at the time of foaming tends to be impaired, such being undesirable. On the other hand, if it is less than 12 mass %, the deflection characteristics in the above-described flexible foam tends to be inadequate, such being undesirable.

The fluorinated compound (F) is used in an amount of from 0.00001 to 1 part by mass per 100 parts by mass of all active hydrogen compounds. If it is less than 0.00001 part by mass, the above-mentioned flexible foam characteristics will not be obtained, such being undesirable. On the other hand, if it exceeds 1 part by mass, the stability of the foam at the time of foaming tends to be impaired, such being undesirable. Here, all active hydrogen compounds mean compounds containing active hydrogen atoms capable of reacting with isocyanate groups, such as the high molecular weight polyoxyalkylene polyol, the crosslinking agent and water. The amount of the fluorinated compound (F) to be used, is preferably from 0.0001 to 1 part by mass, particularly preferably from 0.01 to 1 part by mass, per 100 parts by mass of the total amount of all active hydrogen compounds.

As the foam stabilizer, other compound may be used together, and it is particularly preferred to use a silicone compound together. As such a silicone compound, a silicone foam stabilizer which is commonly used for a flexible urethane foam, may be used. The amount of such a silicone foam stabilizer is preferably from 0.001 to 3 parts by mass per 100 parts by mass of the total amount of all active hydrogen compounds.

Polyisocyanate

The polyisocyanate compound to be used for the production of the polyurethane foam of the present invention is preferably an aromatic polyisocyanate, such as tolylene diisocyanate (TDI), diphenylmethane diisocyanate (MDI) or polymethylenepolyphenyl polyisocyanate (crude MDI). These polyisocyanates may be in the form of a mixture, and a mixture of TDI and crude MDI in a mass ratio of from 85/15 to 75/25 is particularly preferred.

The amount of the polyisocyanate compound is such that the numerical value (this value is usually referred to as an isocyanate index) represented by 100 times the ratio of the number of isocyanate groups to the total number of active hydrogen such as the polyoxyalkylene polyol and water, is preferably from 80 to 120, particularly preferably from 85 to 115.

Blowing Agent

As the blowing agent in the present invention, at least one blowing agent selected from water and an inert gas is preferably used. As the inert gas, air, nitrogen or carbon dioxide may, for example, be mentioned. It is preferred to use only water. The amount of such a blowing agent is not particularly limited, and in a case where only water is used, it is preferably at most 10 parts by mass, particularly preferably from 0.1 to 8 parts by mass, per 100 parts by mass of the high molecular weight polyoxyalkylene polyol. Other blowing agent may also be used in combination in a proper amount depending upon the requirement for e.g. a desired foaming degree.

Crosslinking Agent

In the present invention, a crosslinking agent may be used. As the crosslinking agent, a polyol having a hydroxyl value of from 200 to 2,000 mgKOH/g and an average number of hydroxyl groups of from 2 to 8, is preferred. The amount of the crosslinking agent to be used, is preferably from 0.1 to 10 parts by mass, more preferably from 0.5 to 10 parts by mass, per 100 parts by mass of the high molecular weight polyoxyalkylene polyol.

Catalyst

As the catalyst in the present invention, a catalyst which accelerates the urethane-forming reaction may be used. For example, a tertiary amine such as triethylene diamine bis [(2-dimethylamino)ethyl]ether or N,N,N',N'-tetramethylhexamethylenediamine, a metal carboxylate such as potassium acetate or potassium 2-ethylhexanoate, or an organic metal compound such as dibutyl tin dilaurate or stannous octoate may be mentioned.

Others

In the present invention, known various additives and adjuvants may be used as the case requires, such as an emulsifier, an aging preventive agent such as an antioxidant, or an ultraviolet absorber, a filler such as calcium carbonate or barium sulfate, a flame retardant, a plasticizer, a colorant and an anti-fungus agent.

Production Process

The production and molding of the flexible polyurethane foam is preferably carried out by a method of injecting a reactive mixture directly into a mold by means of a low pressure foaming machine or a high pressure foaming machine (i.e. a reactive injection molding method) or a method of injecting the reactive mixture into an open state mold. The high pressure foaming machine is usually preferably of a type in which two liquids are mixed, and one liquid is a polyisocyanate compound, and the other liquid is a mixture of all materials other than the polyisocyanate compound. In some cases, a reactive mixture may be formed by a total of three components having a catalyst, a cell opener (which is usually used as dispersed or dissolved in a part of the high molecular weight polyoxyalkylene polyol), etc. as a separate component. The flexible polyurethane foam of the present invention is usually produced by a cold curing method, but it may be produced also by a method other than the cold curing method, such as a method containing a heating step.

Physical Properties of the Flexible Foam

The core density of the flexible polyurethane foam of the present invention is preferably from 30 to 70 kg/m$^3$, and to be suitable for a seat cushion for an automobile, the core density is particularly preferably from 35 to 60 kg/m$^3$. If the core density is lower than 30 kg/m$^3$, the durability and the riding comfort performance tend to deteriorate. Further, if the core density exceeds 70 kg/m$^3$, the durability and the riding comfort performance may be good, but when an application to a seat for an automobile is taken into consideration, such a high density is undesirable, since it hinders improvement of the fuel cost.

The hardness of the flexible polyurethane foam of the present invention is such that with respect to a foam obtained by foaming into a thickness of 100 mm, the 25% hardness (ILD) measured in accordance with JIS K-6400 (1997) is preferably from 180 to 500 N/314 cm$^2$, more preferably from 180 to 350 N/314 cm$^2$. If it is lower than 180 N/314 cm$^2$, the supported feeling of occupant tends to be impaired, such being undesirable. On the other hand, if it exceeds 500 N/314 cm$^2$, the deflection as a seat tends to be small, thus leading to a decrease of the riding comfort, such being undesirable.

The flexible polyurethane foam of the present invention is preferably such that with respect to a foam obtained by foaming into a thickness of 100 mm, X i.e. the 25% hardness (ILD) measured in accordance with JIS K6400 (1997) and Y (mm) i.e. the value (difference in deflection on pressure side) obtained by subtracting the deflection on 500 N pressure side from the deflection on 900 N pressure side obtained from a load-deflection curve measured by means of a pressure plate (Tekken Plate) in accordance with JIS E7104 (2002) by applying a load at a constant rate of at most 10 mm/sec, satisfy a relation formula represented by the formula (1):

$$Y \geq -0.000370842X^2 + 0.225401X - 10.5013 \qquad (1)$$

By satisfying the range of the above relation formula, it is possible to secure a sufficient deflection as a seat.

Further, the flexible polyurethane foam of the present invention is preferably such that with respect to a foam obtained by foaming into a thickness of 100 mm, when the deflection on 500 N pressure side obtained from a load-deflection curve as measured by means of a pressure plate (Tekken Plate) in accordance with JIS E7104 (2002) by applying a load at a constant rate of at most 10 mm/sec, is from 5.0 to 55.0 mm, Y (mm) i.e. the value (the difference in deflection on pressure side) obtained by subtracting the deflection on 500 N pressure side from the deflection on 900 N pressure side, is from 22.5 to 33.0 mm, particularly preferably from 27.0 to 33.0 mm.

When the deflection on the 500 N pressure side is from 5.0 to 55.0 mm, if Y (mm) i.e. the value (the difference in deflection on pressure side) obtained by subtracting the deflection on 500 N pressure side from the deflection on 900 N pressure side, is less than 22.5 mm, the bottom-hitting feeling of the seat tends to result, such being undesirable. On the other hand, if the Y i.e. the difference (mm) in deflection on pressure side exceeds 33.0 mm, the posture-stability. performance tends to be poor, such being undesirable.

The flexible polyurethane foam of the present invention is further preferably such that with respect to a foam obtained by foaming into a thickness of 100 mm, when the deflection on 500 N pressure side obtained from a load-deflection curve measured by means of a pressure plate (Tekken Plate) in accordance with JIS E7104 (2002) by applying a load at a constant rate of at most 10 mm/sec, is from 18.0 to 55.0 mm, Y (mm) i.e. the value (the difference in deflection on pressure side) obtained by subtracting the deflection on 500 N pressure side from the deflection on 900 N pressure side, is from 22.5 to 33.0 mm, more preferably from 27.0 to 33.0 mm.

EXAMPLES

Now, the present invention will be described in further detail with reference to Examples, but the present invention is by no means thereby restricted.

Among starting materials, a polyisocyanate compound was put into one starting material tank of a reactive injection molding apparatus, and its liquid temperature was adjusted to from 25 to 27° C. Whereas, a mixture comprising a polyoxyalkylene polyol, a crosslinking agent, a catalyst, a silicone foam stabilizer, a blowing agent and a fluorinated compound, was put into the other starting material tank, and the liquid temperature of the tank was adjusted to from 25 to 27° C. Here, the fluorinated compound was uniformly dispersed in an amine catalyst and then mixed. The polyisocyanate compound and a polyol mixture were used to obtain the isocyanate index shown in Tables 3 to 6, and using a two liquid mixing type reactive injection molding apparatus (high pressure foaming machine), a flexible polyurethane foam was molded.

The injection conditions were such that the injection pressure was 13.7 MPa, and the injection amount was 300 g/sec. As the mold for molding, a mold having an inside dimension of 400 mm×400 mm×100 mm in height was used. The mold temperature was adjusted to from 58 to 62° C. After injecting the starting materials into the mold, a cover was put to close the mold, followed by curing for 6 minutes. Then, a flexible polyurethane foam was taken out and left to stand for at least 24 hours, whereupon various physical properties were measured.

The blend proportions (unit: parts by mass) at the time of the production of the foam, and foam physical properties, vibration characteristics and moldability of the flexible polyurethane foam thereby obtained, are shown in Tables 3 to 6. Examples 1 to 10 are Examples of the present invention, and Examples 11 to 20 are Comparative Examples.

Foam Physical Properties

As the foam physical properties, the total density (unit: kg/m$^3$), the density (unit: kg/m$^3$) of core portion, 25% hardness (ILD) (unit: N/314 cm$^2$), the impact resilience (unit: %) of core portion, the tear strength (unit: N/cm), the tensile strength (unit: kPa), the elongation (unit: %), the dry heat compression set (Dry Set) (unit: %), the wet heat compression set (Wet Set) (unit: %) and the hysteresis loss (unit: %) were evaluated.

The density of core portion and the impact resilience of core portion were measured by using a sample cut out from the center portion of the foam excluding the skin portion, in a size of 100 mm×100 mm×50 mm in height.

Further, the total density, the density of core portion, the 25% hardness (ILD), the impact resilience of core portion, the tear strength, the tensile strength, the elongation, the dry set, the wet set, and the hysteresis loss were measured in accordance with JIS K6400 (1997). Here, the hysteresis loss was measured by using a pressure plate (Tekken Plate) in accordance with JIS E7104 (2002).

In the test method for obtaining the load-deflection curve, the measurement was carried out by using a pressure plate of an oval shape having a long diameter A of 300 mm, a short diameter B of 250 mm and a thickness C of at least 35 mm in accordance with JIS E7104 (2002) and by applying a load at a constant rate of 1.7 mm/sec. From the load-deflection curve, the deflection (mm) under a load of 500 N (Newton load) was obtained. The difference deflection Y (mm) on pressure side was obtained from the deflection (mm) on pressure side under a load of 900 N and the deflection on pressure side under a load of 500 N (the value obtained by subtracting the latter from the former, is Y).

The 25% hardness (ILD) is represented by X, and the value y was calculated by the following formula (4).

$$y = -0.000370842X^2 + 0.225401X - 10.5013 \quad (4)$$

Vibration Characteristics

As the vibration characteristics, the resonance frequency (unit: Hz), the transmissibility at resonance frequency (the absolute displacement measured) and the transmissibility at 6 Hz (the absolute displacement measured) were evaluated. The resonance frequency, the transmissibility at resonance frequency (the absolute displacement measured) and the transmissibility at 6 Hz (the absolute displacement measured) were measured by methods in accordance with JASO B407-87. As the conditions for measuring the vibration characteristics, a Tekken Plate (load: 490 N) was used as a pressure plate, and the vibration total amplitude was adjusted to be 5 mm.

Moldability

For the moldability, crushing performance was evaluated. Here, the crushing performance is one obtained by evaluating the permeability of the foam. Namely, the obtained flexible polyurethane foam was passed through rollers to exert a pressure to the foam, whereby the load required to let the foam cells opened, was evaluated. The required load is small as the ratio of closed cells in the foam is low i.e. as the communication performance is good.

Starting Materials Used

Polyols a1 to a5: Polyoxypropyleneoxyethylene polyols having polyoxyethylene groups at their terminals.

TABLE 1

| | Polyol | | | | |
|---|---|---|---|---|---|
| | a1 | a2 | a3 | a4 | a5 |
| Number of hydroxyl groups in the initiator | 3 | 3 | 3 | 3 | 3 |
| Hydroxyl value (mgKOH/g) | 24.0 | 28.0 | 33.5 | 24.0 | 24.0 |
| Average molecular weight per hydroxyl group | 2333 | 2000 | 1667 | 2333 | 2333 |
| Content of terminal oxyethylene groups (mass %) | 15 | 16 | 16 | 14 | 14 |
| Total content of all oxyethylene groups (mass %) | 15 | 16 | 16 | 19 | 19 |
| Unsaturation value (meq/g) | 0.04 | 0.06 | 0.04 | 0.005 | 0.015 |
| Viscosity (25° C., mPa · s) | 1500 | 1200 | 850 | 1600 | 1600 |

Polyol b1: Fine polymer particles-dispersed polyol containing 35 mass % of fine polymer particles, obtained by copolymerizing acrylonitrile and styrene in polyoxyalkylene polyol a3.

Polyol b2: A polyoxyethylene/polyoxypropylene triol having an oxyethylene group content of 80% and having a hydroxyl value of 48 (mgKOH/g), produced by using an initiator having three hydroxyl groups.

Polyol b3: Fine polymer particles-dispersed polyol containing 20 mass % of fine polymer particles, obtained by polymerizing acrylonitrile in polyoxyalkylene polyol a1.

Crosslinking agent c1: Diethanolamine

Crosslinking agent c2: Polyoxyethylene tetraol having four hydroxyl groups and having a hydroxyl value of 562 (mgKOH/g).

Crosslinking agent c3: A polyoxyethylene/polyoxypropylene polyol having an oxyethylene group content of 46 mass % and having a hydroxyl value of 450 (mgKOH/g), produced by using an initiator having six hydroxyl groups.

Catalyst d1: A dipropylene glycol solution of triethylenediamine. Tradename: TEDA-L33, manufactured TOSOH CORPORATION.

Catalyst d2: A dipropylene glycol solution of bis-[(2-dimethylamino)ethyl]ether. Tradename: TOYOCAT-ET, manufactured by TOSOH CORPORATION.

Catalyst d3: An amine catalyst, tradename: TOYOCAT-NCT, manufactured by TOSOH CORPORATION.

Catalyst d4: An amine catalyst, tradename: Niax A-300, manufactured by Air Products and Chemicals.

Silicone foam stabilizer e1: Tradename: SF-2962, manufactured by Toray Dow Corning Silicone.

Silicone foam stabilizer e2: Tradename: L-3601, manufactured by Nippon Unicar Company, Limited.

Silicone foam stabilizer e3: Tradename: SZ-1327, manufactured by Nippon Unicar Company, Limited.

Fluorinated compounds f1 to f6 have structures as identified in Table 2.

The fluorine content was measured by a 19F NMR method employing deuterio chloroform as a solvent. Namely, a deuterio chloroform solution of 1,1,2-trichlorotrifluoroethane having a concentration of 1 mass % was prepared, and then, a sample (fluorinated compound f1 to f6) was dissolved in this solution at a concentration of 20 mass %, whereupon the solution was used as a sample for the measurement. The fluorine content was calculated from the peak intensity ratio of 1,1,2-trichlorotrifluoroethane to the measured sample, and the concentration ratio of 1,1,2-trichlorotrifluoroethane to the sample in the measured sample. Further, with respect to f3, f4 and f5, the fluorine content in the effective component (the component excluding the solvent) is shown.

Further, the weight average molecular weight was measured by gel permeation chromatography (GPC).

TABLE 2

| | Fluorine content in the effective component (mass %) | Weight average molecular weight |
|---|---|---|
| f1 Copolymer of $C_8F_{17}C_2H_4OCOCH=CH_2$ and stearyl acrylate in a molar ratio of 5/3 | 47.2 | 3500 |
| f2 Copolymer of $C_8F_{17}SO_2N(C_3H_7)C_2H_4OCOCH=CH_2$ and polyoxyethyleneoxypropylene glycol monoacrylate having oxyethylene groups (54 mass %) and having an average molecular weight of 400, in a molar ratio of 2/1 | 18.2 | 13000 |
| f3 A 43 mass % methyl isobutyl ketone solution of a copolymer of $C_8F_{17}C_2H_4OCOCH=CH_2$ and diethylene glycol monoacrylate in a molar ratio of 1/2 | 37.2 | 3400 |
| f4 A 30 mass % aqueous solution of a polyoxyethylene compound having $C_8F_{17}$ groups at the terminals | 24.9 | 1300 |
| f5 A 75 mass % aqueous solution of a copolymer of $C_6F_{13}C_2H_4OCOC(CH_3)=CH_2$, 2-(diethylamino) ethyl methacrylate, 2-hydroxyethyl methacrylate, and polyethylene glycol dimethacrylate having an average molecular weight of 281 in a molar ratio of 53.4/19.7/26.0/0.9 | 43.6 | 85000 |
| f6 A copolymer of $C_8F_{17}C_2H_4OCOCH=CH_2$ and polyoxyethylene glycol monoacrylate having an average molecular weight of 500, in a molar ratio of 4/6 | 25.1 | 3800 |

Blowing agent g: Water

Polyisocyanate h: A mixture of TDI (mixture of 2,4-tolylene diisocyanate/2,6-tolylene diisocyanate in a ratio of 80/20 mass %) and polymethylenepolyphenyl polyisocyanate in a ratio of 80/20 mass %, having a NCO group content of 44.8%. Tradename: CORONATE 1021, manufactured by Nippon Polyurethane Industry Co., Ltd.

TABLE 3

| | Ex. 1 | Ex. 2 | Ex. 3 | Ex. 4 |
|---|---|---|---|---|
| Polyol a1 | 60 | 60 | 60 | 50 |
| Polyol b1 | 40 | 40 | 40 | 50 |
| Polyol b2 | 3.0 | 3.0 | 3.0 | 3.0 |
| Crosslinking agent c1 | 0.5 | 0.5 | 0.5 | |
| Crosslinking agent c2 | 0.5 | 0.5 | 0.5 | 1.5 |
| Catalyst d1 | 0.42 | 0.42 | 0.42 | 0.08 |
| Catalyst d2 | 0.10 | 0.10 | 0.10 | 0.10 |
| Catalyst d3 | | | | 0.10 |
| Silicone foam stabilizer e1 | | | | 0.7 |
| Silicone foam stabilizer e2 | 0.7 | 0.7 | 0.7 | |
| Fluorinated compound f1 | 0.01 | | | |
| Fluorinated compound f2 | | 0.01 | | 0.03 |
| Fluorinated compound f3 | | | 0.01 | |
| Blowing agent g | 3.3 | 3.3 | 3.3 | 2.7 |
| Isocyanate index h | 105 | 105 | 105 | 100 |
| Total density | 47.8 | 48.8 | 47.9 | 56.1 |
| Density of core portion | 44.5 | 45.8 | 44.8 | 52.3 |
| 25% hardness (ILD) X | 267 | 278 | 268 | 266 |
| Impact resilience of core portion | 66 | 66 | 67 | 68 |
| Tear strength | 7.5 | 7.9 | 7.4 | 7.4 |
| Tensile strength | 163 | 180 | 171 | 175 |
| Elongation | 109 | 111 | 110 | 115 |
| Dry heat compression set (DRY SET) | 3.1 | 2.8 | 3.0 | 2.4 |
| Wet heat compression set (WET SET) | 10.9 | 9.8 | 10.3 | 7.9 |
| Hysteresis loss | 16.9 | 16.5 | 16.8 | 15.6 |
| Deflection on 500 N pressure side | 25.3 | 24.3 | 25.1 | 25.9 |
| Deflection difference Y on pressure side | 27.3 | 28.5 | 27.6 | 28.4 |
| Value y in the formula (4) | 23.2 | 23.5 | 23.3 | 23.2 |
| Resonance frequency | 3.5 | 3.4 | 3.5 | 3.4 |
| Transmissibility at resonance frequency | 4.6 | 4.7 | 4.7 | 4.8 |
| Transmissibility at 6 Hz | 0.70 | 0.68 | 0.70 | 0.67 |
| Crushing performance | Good | Good | Good | Good |

TABLE 4

| | Ex. 5 | Ex. 6 | Ex. 7 |
|---|---|---|---|
| Polyol a1 | 60 | | |
| Polyol a2 | | | |
| Polyol a3 | | 60 | |
| Polyol a4 | | | 60 |
| Polyol a5 | | | |
| Polyol b1 | 40 | 40 | 40 |
| Polyol b2 | 1.0 | 1.0 | 1.0 |
| Polyol b3 | | | |
| Crosslinking agent c1 | 0.5 | 0.5 | 0.5 |
| Crosslinking agent c2 | 3.0 | 3.0 | 3.0 |
| Crosslinking agent c3 | | | |
| Catalyst d1 | 0.45 | 0.45 | 0.45 |
| Catalyst d2 | 0.07 | 0.07 | 0.07 |
| Catalyst d3 | | | |
| Catalyst d4 | | | |
| Silicone foam stabilizer e1 | 0.4 | 0.4 | 0.4 |
| Silicone foam stabilizer e2 | | | |
| Silicone foam stabilizer e3 | 0.4 | 0.4 | 0.4 |
| Fluorinated compound f1 | | | |
| Fluorinated compound f2 | | | |
| Fluorinated compound f3 | | | |
| Fluorinated compound f4 | | | |
| Fluorinated compound f5 | 0.1 | 0.1 | 0.1 |
| Fluorinated compound f6 | | | |
| Blowing agent g | 2.93 | 2.93 | 2.93 |
| Isocyanate index h | 105 | 105 | 105 |
| Total density | 49.6 | 50.3 | 49.7 |
| Density of core portion | 46.2 | 46.7 | 45.6 |
| 25% hardness (ILD) X | 236 | 244 | 228 |
| Impact resilience of core portion | 68 | 59 | 68 |
| Tear strength | 5.9 | 5.7 | 6.2 |
| Tensile strength | 145 | 122 | 157 |
| Elongation | 102 | 93 | 103 |
| Dry heat compression set (DRY SET) | 3.5 | 5.0 | 4.2 |
| Wet heat compression set (WET SET) | 13.3 | 14.9 | 14.6 |
| Hysteresis loss | 18.0 | 20.7 | 17.1 |
| Deflection on 500 N pressure side | 34 | 31 | 34 |
| Deflection difference Y on pressure side | 23.3 | 24.9 | 23.0 |
| Value y in the formula (4) | 22.0 | 22.4 | 21.6 |
| Resonance frequency | 3.30 | 3.48 | 3.38 |
| Transmissibility at resonance frequency | 3.50 | 3.03 | 3.10 |
| Transmissibility at 6 Hz | 0.53 | 0.65 | 0.58 |
| Crushing performance | Good | Good | Good |

| | Ex. 8 | Ex. 9 | Ex. 10 |
|---|---|---|---|
| Polyol a1 | | 60 | |
| Polyol a2 | | | |

TABLE 4-continued

| | | | |
|---|---|---|---|
| Polyol a3 | | | |
| Polyol a4 | | | 45 |
| Polyol a5 | 60 | | |
| Polyol b1 | 40 | 60 | |
| Polyol b2 | 1.0 | | 0.4 |
| Polyol b3 | | | 55 |
| Crosslinking agent c1 | 0.5 | 0.2 | |
| Crosslinking agent c2 | 3.0 | 0.6 | |
| Crosslinking agent c3 | | | 2.0 |
| Catalyst d1 | 0.45 | 0.23 | 0.18 |
| Catalyst d2 | 0.07 | 0.06 | 0.1 |
| Catalyst d3 | | 0.15 | |
| Catalyst d4 | | | 0.4 |
| Silicone foam stabilizer e1 | 0.4 | | 0.2 |
| Silicone foam stabilizer e2 | | | |
| Silicone foam stabilizer e3 | 0.4 | 0.7 | 0.5 |
| Fluorinated compound f1 | | | |
| Fluorinated compound f2 | | | |
| Fluorinated compound f3 | | | |
| Fluorinated compound f4 | | | |
| Fluorinated compound f5 | 0.1 | | 0.04 |
| Fluorinated compound f6 | | 0.03 | |
| Blowing agent g | 2.93 | 3.80 | 2.86 |
| Isocyanate index h | 105 | 105 | 105 |
| Total density | 49.8 | 45.2 | 55.8 |
| Density of core portion | 47.8 | 40.8 | 52.8 |
| 25% hardness (ILD) X | 221 | 289 | 389 |
| Impact resilience of core portion | 55 | 53 | 55 |
| Tear strength | 5.9 | 6.1 | 8.4 |
| Tensile strength | 144 | 89 | 167 |
| Elongation | 100 | 81 | 95 |
| Dry heat compression set (DRY SET) | 4.6 | 1.8 | 3.3 |
| Wet heat compression set (WET SET) | 15.0 | 13.4 | 14.0 |
| Hysteresis loss | 18.7 | 21.9 | 21.3 |
| Deflection on 500 N pressure side | 35 | 24 | 16 |
| Deflection difference Y on pressure side | 22.6 | 26.2 | 23.3 |
| Value y in the formula (4) | 21.2 | 23.7 | 21.1 |
| Resonance frequency | 3.55 | 3.53 | 4.15 |
| Transmissibility at resonance frequency | 2.20 | 4.50 | 2.73 |
| Transmissibility at 6 Hz | 0.85 | 0.68 | 1.25 |
| Crushing performance | Good | Good | Good |

TABLE 5

| | Ex. 11 | Ex. 12 | Ex. 13 | Ex. 14 |
|---|---|---|---|---|
| Polyol a1 | 60 | 60 | 60 | |
| Polyol a2 | | | | 60 |
| Polyol b1 | 40 | 40 | 40 | 40 |
| Polyol b2 | 3.0 | 3.0 | 3.0 | 3.0 |
| Crosslinking agent c1 | 0.5 | 0.5 | 0.5 | 0.5 |
| Crosslinking agent c2 | 0.5 | 0.5 | 0.5 | 0.5 |
| Catalyst d1 | 0.42 | 0.42 | 0.42 | 0.42 |
| Catalyst d2 | 0.10 | 0.10 | 0.10 | 0.10 |
| Silicone foam stabilizer e1 | | 0.3 | | 0.3 |
| Silicone foam stabilizer e2 | 0.7 | 0.7 | 0.7 | 0.7 |
| Fluorinated compound f3 | | | 4.0 | |
| Fluorinated compound f4 | 0.01 | | | |
| Blowing agent g | 3.3 | 3.3 | 3.3 | 3.3 |
| Isocyanate index h | 105 | 105 | 105 | 105 |
| Total density | 48.0 | 48.4 | Not measureable as cells are rough and large | 48.5 |
| Density of core portion | 44.3 | 44.1 | | 45.1 |
| 25% hardness (ILD) X | 235 | 232 | | 248 |
| Impact resilience of core portion | 71 | 72 | | 68 |
| Tear strength | 7.6 | 7.5 | | 6.9 |
| Tensile strength | 153 | 173 | | 168 |
| Elongation | 112 | 111 | | 105 |
| Dry heat compression set (DRY SET) | 3.3 | 3.2 | | 3.8 |
| Wet heat compression set (WET SET) | 11.0 | 11.8 | | 12.5 |
| Hysteresis loss | 17.1 | 17.4 | | 18.1 |
| Deflection on 500 N pressure side | 32.1 | 32.4 | | 27.6 |
| Deflection difference Y on pressure side | 21.3 | 20.2 | | 20.2 |
| Value y in the formula (4) | 22.0 | 21.8 | — | 22.6 |
| Resonance frequency | 3.5 | 3.5 | — | 3.7 |
| Transmissibility at resonance frequency | 5.1 | 5.0 | | 4.5 |
| Transmissibility at 6 Hz | 0.90 | 0.93 | | 1.00 |
| Crushing performance | Good | Good | — | Good |

TABLE 6

| | Ex. 15 | Ex. 16 | Ex. 17 |
|---|---|---|---|
| Polyol a1 | 60 | | |
| Polyol a2 | | | |
| Polyol a3 | | 60 | |
| Polyol a4 | | | 60 |
| Polyol a5 | | | |
| Polyol b1 | 40 | 40 | 40 |
| Polyol b2 | 1.0 | 1.0 | 1.0 |
| Polyol b3 | | | |
| Crosslinking agent c1 | 0.5 | 0.5 | 0.5 |
| Crosslinking agent c2 | 3.0 | 3.0 | 3.0 |
| Crosslinking agent c3 | | | |
| Catalyst d1 | 0.45 | 0.45 | 0.45 |
| Catalyst d2 | 0.07 | 0.07 | 0.07 |
| Catalyst d3 | | | |
| Catalyst d4 | | | |
| Silicone foam stabilizer e1 | 0.4 | 0.4 | 0.4 |
| Silicone foam stabilizer e2 | | | |
| Silicone foam stabilizer e3 | 0.4 | 0.4 | 0.4 |
| Fluorinated compound f1 | | | |
| Fluorinated compound f2 | | | |
| Fluorinated compound f3 | | | |
| Fluorinated compound f4 | | | |
| Fluorinated compound f5 | | | |
| Fluorinated compound f6 | | | |
| Blowing agent g | 3.0 | 3.0 | 3.0 |
| Isocyanate index h | 105 | 105 | 105 |
| Total density | 49.4 | 49.4 | 49.5 |
| Density of core portion | 45.2 | 45.5 | 45.8 |
| 25% hardness (ILD) X | 208 | 209 | 198 |
| Impact resilience of core portion | 69 | 65 | 69 |
| Tear strength | 5.7 | 6.4 | 5.9 |
| Tensile strength | 139 | 164 | 136.2 |
| Elongation | 101 | 108 | 99 |
| Dry heat compression set (DRY SET) | 3.9 | 5.8 | 3.9 |
| Wet heat compression set (WET SET) | 14.0 | 16.2 | 14.4 |
| Hysteresis loss | 18.5 | 20.7 | 17.8 |
| Deflection on 500 N pressure side | 38 | 37 | 39 |
| Deflection difference Y on pressure side | 19.9 | 19.8 | 18.9 |
| Value y in the formula (4) | 20.3 | 20.4 | 19.6 |
| Resonance frequency | 3.43 | 3.63 | 3.48 |
| Transmissibility at resonance frequency | 3.88 | 3.95 | 3.58 |
| Transmissibility at 6 Hz | 0.63 | 0.70 | 0.63 |
| Crushing performance | Good | Good | Good |

| | Ex. 18 | Ex. 19 | Ex. 20 |
|---|---|---|---|
| Polyol a1 | | 40 | |
| Polyol a2 | | | |
| Polyol a3 | | | |
| Polyol a4 | | | 45 |
| Polyol a5 | 60 | | |
| Polyol b1 | 40 | 60 | |
| Polyol b2 | 1.0 | | 0.4 |
| Polyol b3 | | | 55 |
| Crosslinking agent c1 | 0.5 | 0.2 | |

TABLE 6-continued

| | | | |
|---|---|---|---|
| Crosslinking agent c2 | 3.0 | 0.6 | |
| Crosslinking agent c3 | | | 2.0 |
| Catalyst d1 | 0.45 | 0.23 | 0.18 |
| Catalyst d2 | 0.07 | 0.06 | 0.1 |
| Catalyst d3 | | 0.15 | |
| Catalyst d4 | | | 0.4 |
| Silicone foam stabilizer e1 | 0.4 | | 0.2 |
| Silicone foam stabilizer e2 | | | |
| Silicone foam stabilizer e3 | 0.4 | 0.7 | 0.5 |
| Fluorinated compound f1 | | | |
| Fluorinated compound f2 | | | |
| Fluorinated compound f3 | | | |
| Fluorinated compound f4 | | | |
| Fluorinated compound f5 | | | |
| Fluorinated compound f6 | | | |
| Blowing agent g | 3.0 | 3.80 | 2.89 |
| Isocyanate index h | 105 | 105 | 107.5 |
| Total density | 49.3 | 44.8 | 56.7 |
| Density of core portion | 44.9 | 40.2 | 53.1 |
| 25% hardness (ILD) X | 199 | 222 | 385 |
| Impact resilience of core portion | 68 | 57 | 59 |
| Tear strength | 6.2 | 8.1 | 8.9 |
| Tensile strength | 153 | 119 | 155 |
| Elongation | 108 | 91 | 100 |
| Dry heat compression set (DRY SET) | 1.7 | 2.8 | 3.2 |
| Wet heat compression set (WET SET) | 15.8 | 14.5 | 14.8 |
| Hysteresis loss | 18.3 | 21.4 | 21.5 |
| Deflection on 500 N pressure side | 39 | 35 | 12 |
| Deflection difference Y on pressure side | 19.1 | 20.4 | 20.4 |
| Value y in the formula (4) | 19.7 | 21.3 | 21.3 |
| Resonance frequency | 3.48 | 3.60 | 4.10 |
| Transmissibility at resonance frequency | 3.40 | 4.60 | 4.45 |
| Transmissibility at 6 Hz | 0.65 | 0.78 | 1.10 |
| Crushing performance | Good | Good | Good |

As shown in Tables 3 to 6, the flexible urethane foam of the present invention employs a certain specific fluorinated compound as a foam stabilizer, whereby it is possible to obtain a foam with little bottom-hitting feeling, as the deflection difference on pressure side as between 900 N and 500 N, of a foam obtained by forming into a thickness of 100 mm, is large. Each of the contents shown in these Examples is excellent in vibration characteristics, particularly in transmissibility at resonance frequency and transmissibility at 6 Hz, and thus provides good riding comfort.

INDUSTRIAL APPLICABILITY

The flexible polyurethane foam of the present invention is useful for a cushion, a seat, etc. It is particularly suitable for a seat for a vehicle and is especially suitable for a seat for an automobile.

The entire disclosure of Japanese Patent Application No. 2003-395465 filed on Nov. 26, 2003 including specification, claims and summary is incorporated herein by reference in its entirety.

What is claimed is:

1. A flexible polyurethane foam obtained by reacting a high molecular weight polyoxyalkylene polyol or a polymer-dispersed polyol comprising fine polymer particles in the high molecular weight polyoxyalkylene polyol, with a polyisocyanate compound in the presence of a catalyst, a blowing agent and a foam stabilizer, wherein at least a part of the foam stabilizer is a fluorinated compound (F) and is used in an amount of from 0.00001 to 1 part by mass per 100 parts by mass of all active hydrogen compounds, the fluorinated compound (F) being: a compound which is a copolymer of a fluorinated acrylate or a fluorinated methacrylate (p), an alkyl acrylate having a long chain alkyl group, an alkyl methacrylate having a long chain alkyl group, an acrylate comprising an oxyalkylene group or a methacrylate comprising an oxyalkylene group (q), and optional other copolymerizable monomer (r), wherein the fluorine content is from 12 to 50 mass %.

2. The flexible polyurethane foam according to claim 1, which has a density of core portion of from 30 to 70 kg/m$^3$.

3. The flexible polyurethane foam according to claim 2, which has a density of core portion of from 35 to 60 kg/m$^3$.

4. The flexible polyurethane foam according to claim 1, wherein with respect to a foam obtained by foaming into a thickness of 100 mm, X (N/314 cm$^2$)(i.e. the 25% hardness (ILD) measured in accordance with JIS K6400 (1997)) and Y (mm) (i.e. the value (the difference in deflection on pressure side) obtained by subtracting the deflection on 500 N pressure side from the deflection on 900 N pressure side obtained from a load-deflection curve as measured by means of a pressure plate (Tekken Plate) in accordance with JIS E7104 (2002)) satisfy a relation formula represented by the formula (1):

$$Y \geq -0.000370842X^2 + 0.225401X - 10.5013 \qquad (1).$$

5. The flexible polyurethane foam according to claim 1, wherein with respect to a foam obtained by foaming into a thickness of 100 mm, when the deflection on 500 N pressure side obtained from a load-deflection curve as measured by means of a pressure plate (Tekken Plate) in accordance with JIS E7104 (2002) is from 5.0 to 55.0 mm, Y (mm) (i.e. the value (the difference in deflection on pressure side) obtained by subtracting the deflection on 500 N pressure side from the deflection on 900 N pressure side) is from 22.5 to 33.0 mm.

6. The flexible polyurethane foam according to claim 1, wherein with respect to a foam obtained by foaming into a thickness of 100 mm, when the deflection on 500 N pressure side obtained from a load-deflection curve as measured by means of a pressure plate (Tekken Plate) in accordance with JIS E7104 (2002) is from 18.0 to 55.0 mm, Y (mm) (i.e. the value (the difference in deflection on pressure side) obtained by subtracting the deflection on 500 N pressure side from the deflection on 900 N pressure side) is from 22.5 to 33.0 mm.

7. A seat for an automobile made of the flexible polyurethane foam as defined in claim 1.

8. A process for producing a flexible polyurethane foam, which comprises reacting a high molecular weight polyoxyalkylene polyol or a polymer-dispersed polyol comprising fine polymer particles in the high molecular weight polyoxyalkylene polyol, with a polyisocyanate compound in the presence of a catalyst, a blowing agent and a foam stabilizer, wherein at least a part of the foam stabilizer is a fluorinated compound (F) and is used in an amount of from 0.00001 to 1 part by mass per 100 parts by mass of all active hydrogen compounds, the fluorinated compound (F) being: a compound which is a copolymer of a fluorinated acrylate or a fluorinated methacrylate (p), an alkyl acrylate having a long chain alkyl group, an alkyl methacrylate having a long chain alkyl group, an acrylate comprising an oxyalkylene group or a methacrylate comprising an oxyalkylene group (q), and optional another copolymerizable monomer (r), wherein the fluorine content is from 12 to 50 mass %.

9. The process for producing a flexible polyurethane foam according to claim 8, wherein at least one member selected from water and an inert gas is used as the blowing agent.

* * * * *